G. J. ZIEGLER.
FLEXIBLE COUPLING.
APPLICATION FILED FEB. 24, 1920.

1,380,330.

Patented May 31, 1921.

INVENTOR
GEORGE J. ZIEGLER
BY *Hazard & Miller*
ATT'YS.

UNITED STATES PATENT OFFICE.

GEORGE J. ZIEGLER, OF LOS ANGELES, CALIFORNIA, ASSIGNOR OF ONE-THIRD TO SHERWIN GIBBONS, ONE-THIRD TO ERNEST STEWART, AND ONE-THIRD TO FREDERICK C. BEUTEL, ALL OF LOS ANGELES, CALIFORNIA.

FLEXIBLE COUPLING.

1,380,330.  Specification of Letters Patent.  Patented May 31, 1921.

Application filed February 24, 1920. Serial No. 360,560.

*To all whom it may concern:*

Be it known that I, GEORGE J. ZIEGLER, a citizen of the United States, residing at Los Angeles, in the county of Los Angeles and State of California, have invented new and useful Improvements in Flexible Couplings, of which the following is a specification.

This invention relates to a power transmission apparatus, and more particularly to flexible joints for shafting; and the prime object is the provision of a flexible coupling embodying a principle of construction adapted to compensate for variations, or slight differences, in axial alinement of shafts.

A further object is the provision of a device of this character having few and relatively simple parts, which is durable and inexpensive to manufacture.

The invention consists of the construction, the combination, and in details and arrangements of the parts, an embodiment of which invention is illustrated in the accompanying drawings, and described and claimed hereinafter.

Figure 1:
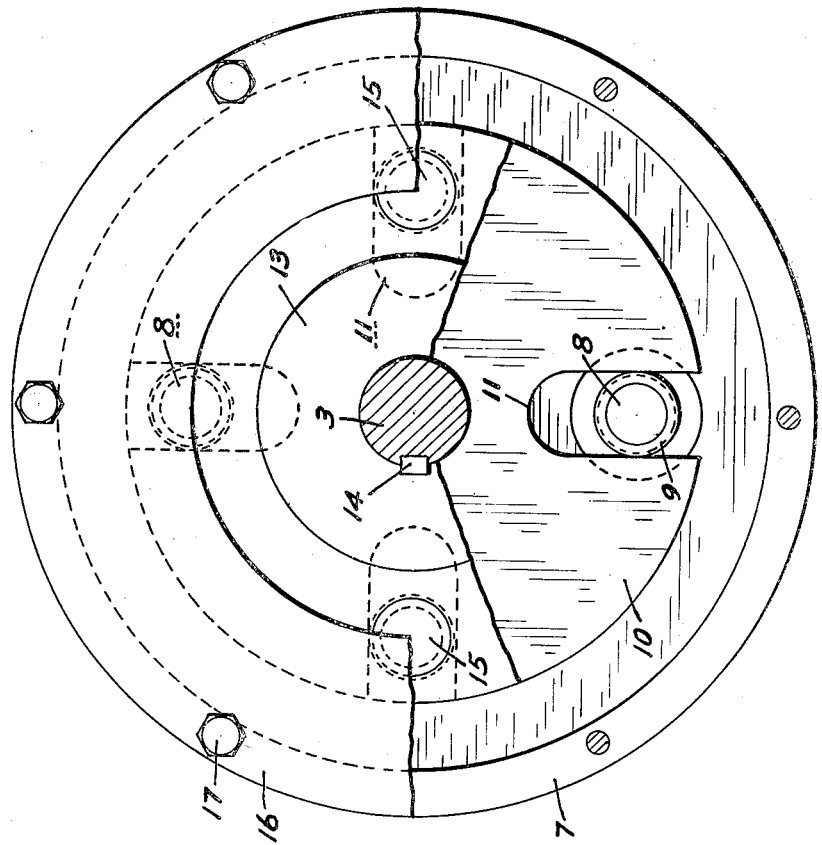
Figure 1 is an end elevation of one side of the clutch, the shaft member being in section and parts of the device in fragments.
Figure 2:
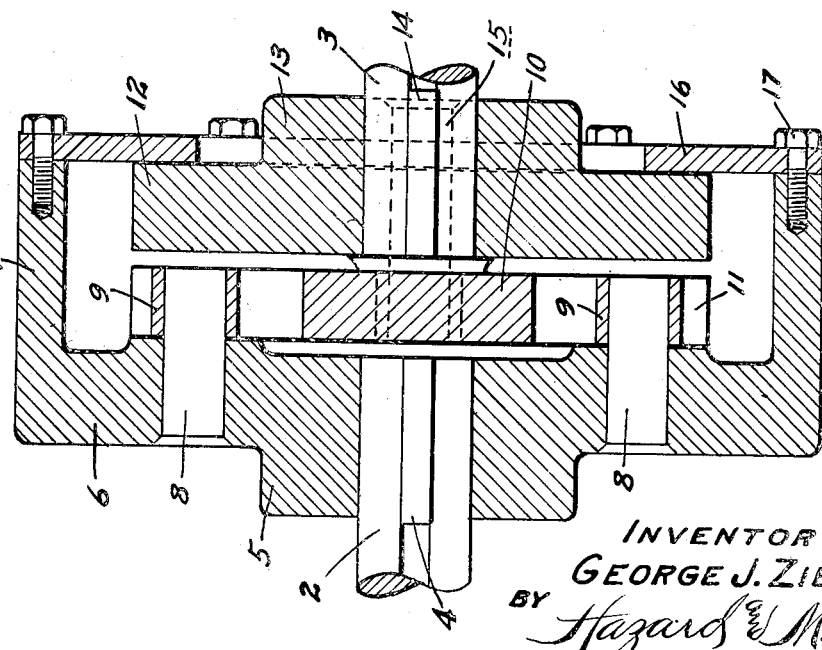
Fig. 2 is a diametrical section along the axis of the joint.

The device is adapted for the transmission of power as between one shaft section 2 and another shaft section 3, the former being keyed as at 4 to the hub 5 of a disk member 6 having a cylindrical flange 7 concentric to the shaft 2. At suitable equi-angular spaces the disk 6 is provided with drive pins 8 extending inwardly under the flange 7 and on these may be mounted anti-friction rollers 9. These rollers project into a disk or intermediate transmitting member 10 having radial slots 11 to receive the respective pins 8 and rollers 9; the slots 11 extending from face to face of the disk 10.

On the opposite side of the disk 10 is arranged a disk 12 having a hub portion 13 that is keyed as at 14 on the shaft section 3 and the disk 12 is provided with a series of pins 15 at equi-angular spaces, these pins extending into respective radial slots 11 formed therefor in the intermediate disk 10.

It will be seen, therefore, that power may be applied to either of the shaft members 2 and 3 and this will serve to drive the intermediate disk 10 which is loosely mounted between the adjacent faces of the disks 6 and 12 but is interlocked with each of the driving disks by the pin members 8 and 15, these latter being adapted to shift radially in the slots in compensation for relative change of axial alinement as between the shaft members 2 and 3.

If desired, the open side of the flange 7 may be provided with a cover device 16 secured as by screws 17, this cover overlapping the outer exposed face of the disk 12 so that the chamber formed may be filled with oil or other lubricant and the parts therefore kept lubricated and protected from dust.

It is obvious that various changes may be made without departing from the spirit of this invention as claimed.

What is claimed is:

A flexible shaft coupling comprising a disk keyed to the drive shaft, a disk keyed to the driven shaft, a transmission disk juxtaposed intermediate said disks, said transmission disk having radial slots in its periphery, pins in said first mentioned disk, rollers on said pins, said pins and rollers adapted to engage diametrically opposed slots in the transmission disk, similar pins and rollers on the second mentioned disk adapted to occupy the oppositely disposed members of a pair of the slots in the transmission disk, a marginal flange projecting outwardly from one side of the first mentioned disk and inclosing the second mentioned disk and the transmission disk, and a ring plate secured to the face of said marginal flange and adapted to contact with the rear face of the second mentioned disk to form an oil chamber.

In testimony whereof I have signed my name to this specification.

GEORGE J. ZIEGLER.